(12) United States Patent
Kawata et al.

(10) Patent No.: US 12,006,418 B2
(45) Date of Patent: Jun. 11, 2024

(54) BINDER COMPOSITION, RIGID BODY, AND METHOD FOR MANUFACTURING RIGID BODY

(71) Applicant: Nippon Shokubai Co., Ltd., Osaka (JP)

(72) Inventors: Yuichi Kawata, Suita (JP); Ikuo Shimizu, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 16/641,364

(22) PCT Filed: Aug. 9, 2018

(86) PCT No.: PCT/JP2018/029950
§ 371 (c)(1),
(2) Date: Feb. 24, 2020

(87) PCT Pub. No.: WO2019/049604
PCT Pub. Date: Mar. 14, 2019

(65) Prior Publication Data
US 2020/0190285 A1   Jun. 18, 2020

(30) Foreign Application Priority Data

Sep. 5, 2017 (JP) ................. 2017-170596

(51) Int. Cl.
| | | |
|---|---|---|
| C08K 5/47 | (2006.01) | |
| C08G 18/62 | (2006.01) | |
| C08K 3/40 | (2006.01) | |
| C08K 5/37 | (2006.01) | |
| C08K 5/46 | (2006.01) | |
| C08K 7/14 | (2006.01) | |

(52) U.S. Cl.
CPC ............ *C08K 5/47* (2013.01); *C08G 18/6225* (2013.01); *C08K 3/40* (2013.01); *C08K 5/37* (2013.01); *C08K 5/46* (2013.01); *C08K 7/14* (2013.01)

(58) Field of Classification Search
CPC . C08K 5/47; C08K 5/37; C08L 101/08; C08F 220/06; C08G 18/6225
USPC .......................................................... 524/83
See application file for complete search history.

(56) References Cited

U.S. PATENT DOCUMENTS

| | | | | |
|---|---|---|---|---|
| 4,719,036 A | * | 1/1988 | Clubley ................. | C09D 5/086 252/391 |
| 5,017,029 A | * | 5/1991 | Andou .................... | B41M 5/10 400/241 |
| 6,274,661 B1 | * | 8/2001 | Chen ...................... | C08K 5/405 524/392 |
| 6,331,350 B1 | | 12/2001 | Taylor et al. | |
| 2006/0111002 A1 | | 5/2006 | Rodrigues | |
| 2008/0000383 A1 | * | 1/2008 | Nagai .................... | C09D 5/084 106/14.44 |
| 2009/0082535 A1 | * | 3/2009 | Nakano ................. | C23F 11/173 526/234 |
| 2009/0226732 A1 | | 9/2009 | Anderson et al. | |
| 2009/0252962 A1 | | 10/2009 | Michl et al. | |
| 2012/0064323 A1 | * | 3/2012 | Shoemake ............... | C08J 5/244 524/517 |
| 2016/0040300 A1 | * | 2/2016 | Morris ..................... | B05D 7/16 252/389.61 |
| 2017/0321032 A1 | * | 11/2017 | Shimizu .................. | C03C 13/06 |

FOREIGN PATENT DOCUMENTS

| | | | |
|---|---|---|---|
| AU | 6887298 A | * | 11/1998 |
| CN | 1317526 A | | 10/2001 |
| CN | 1650049 A | | 8/2005 |
| CN | 101215438 A | | 7/2008 |
| CN | 102268203 A | | 12/2011 |
| CN | 104487611 A | | 4/2015 |
| CN | 104650779 A | | 5/2015 |
| CN | 106085145 A | | 11/2016 |
| EP | 0161222 A1 | | 11/1985 |
| EP | 0944682 A1 | | 9/1999 |
| EP | 1935940 A1 | | 6/2008 |
| JP | S55-066970 A | | 5/1980 |
| JP | S61-005069 A | | 1/1986 |
| JP | H01-268747 A | | 10/1989 |
| JP | 05214273 A | * | 8/1993 |
| JP | H05-214273 A | | 8/1993 |
| JP | H08-060037 A | | 3/1996 |
| JP | H10-195345 A | | 7/1998 |
| JP | 2003-035385 A | | 2/2003 |
| JP | 2007-169545 A | | 7/2007 |
| JP | 2009-256492 A | | 11/2009 |
| JP | 2011-075923 A | | 4/2011 |
| JP | 2014-177539 A | | 9/2014 |
| JP | 2016-060932 A | | 4/2016 |
| JP | 2016-138013 A | | 8/2016 |
| WO | 98/027176 A1 | | 6/1998 |
| WO | 99/061384 A1 | | 12/1999 |
| WO | 03/093534 A1 | | 11/2003 |

(Continued)

OTHER PUBLICATIONS

Machine translation of JP 05-214273 (Year: 1993).*

(Continued)

*Primary Examiner* — Doris L Lee
(74) *Attorney, Agent, or Firm* — Morgan, Lewis & Bockius LLP

(57) ABSTRACT

A binder composition comprising a rust inhibitor having a sulfur atom in the molecule, and a carboxyl group-containing polymer.

25 Claims, No Drawings

(56) References Cited

FOREIGN PATENT DOCUMENTS

| WO | WO 2011/064735 | * | 6/2011 |
| WO | WO 2016/104261 | * | 6/2016 |
| WO | WO 2016 118502 | * | 7/2016 |

OTHER PUBLICATIONS

International Search Report issued in corresponding International Patent Application No. PCT/JP2018/029950 dated Oct. 30, 2018.
International Preliminary Report on Patentability and Written Opinion issued in corresponding International Patent Application No. PCT/JP2018/029950 dated Mar. 19, 2020.
Extended European Search Report issued in counterpart European Patent Application No. 18854389.6 dated Mar. 5, 2021.
Zhang Hongshuang et al., "Materials and Processes", 2015 (see partial English translation).
Li Zhaoqiang, "Production and Application of Modern Coatings (2nd edition)", 2017 (see partial English translation).
1 Office Action issued in counterpart European Patent Application No. 18854389.6 dated Jun. 5, 2023.

\* cited by examiner

BINDER COMPOSITION, RIGID BODY, AND METHOD FOR MANUFACTURING RIGID BODY

TECHNICAL FIELD

The present invention relates to a binder composition, a fixed body, and a method for manufacturing a fixed body.

BACKGROUND ART

Heat-resistant formed bodies prepared by attaching a binder to glass fibers or the like and forming those glass fibers into mats are widely used as thermal insulation materials for houses and storehouses, apparatuses and devices, and the like. As the binder, phenol-formaldehyde binders are widely used. However, the phenol-formaldehyde binders have a problem that unreacted formaldehyde remains in formed bodies, and formaldehyde is released after construction of houses or the like. Thus, a binder which does not release formaldehyde has been examined.

For example, Patent Literature 1 discloses a fiberglass binder (binder) which comprises a polycarboxy polymer and a polyol and whose pH is adjusted to less than 3.5, while Patent Literature 2 discloses an aqueous binder for inorganic fibers comprising a polycarboxylic acid, a crosslinking agent, and a curing accelerator.

CITATION LIST

Patent Literature

Patent Literature 1: U.S. Pat. No. 6,331,350
Patent Literature 2: Japanese Unexamined Patent Publication No. 2007-169545

SUMMARY OF INVENTION

Technical Problem

By the way, as described in paragraph 0044 of Patent Literature 2, it is known that the problem that if a binder having a low pH is used, manufacturing equipment is corroded due to long-term use occurs. For this reason, although such a binder having a low pH according to Patent Literature 1 or the like may exhibit favorable properties in a laboratory level, problems may arise if the binder is applied to actual manufacturing.

Moreover, for the binder according to Patent Literature 2, although the pH is adjusted by use of aqueous ammonia to prevent the corrosion of the manufacturing equipment, it is undesirable to use a large amount of aqueous ammonia in terms of a detoxification treatment of volatilized ammonia and a treatment of drainage water containing ammonia. Furthermore, as a result of the examination by the present inventors, it has been revealed that if formed bodies (fixed bodies) of glass fibers or the like are manufactured using the binder according to Patent Literature 2, the fixed bodies are yellowed to have poor appearances, or that there is room for an improvement with respect to a slow curing rate.

Accordingly, an object of the present invention is to provide a binder composition with which the corrosion of manufacturing equipment and yellowing of a fixed body to be manufactured are sufficiently prevented, and a favorable curing rate can be attained, and a fixed body using this. Moreover, another object of the present invention is to provide a method for manufacturing a fixed body with which the corrosion of manufacturing equipment and the yellowing of a fixed body to be manufactured are sufficiently prevented, and a favorable curing rate can be attained.

Solution to Problem

In consideration of such circumstances above, as a result of extensive research, the present inventors have completed the inventions shown in [1] to [13] below.

[1] A binder composition comprising a rust inhibitor having a sulfur atom in the molecule, and a carboxyl group-containing polymer.
[2] The binder composition according to [1], wherein the rust inhibitor further has a nitrogen atom in the molecule.
[3] The binder composition according to [2], wherein the rust inhibitor comprises at least one selected from the group consisting of thiazole-based rust inhibitors, benzothiazole-based rust inhibitors, thiadiazole-based rust inhibitors, and thiourea-based rust inhibitors.
[4] The binder composition according to any one of [1] to [3], wherein the carboxyl group-containing polymer further has a hydroxyl group.
[5] The binder composition according to any one of [1] to [4], wherein the carboxyl group-containing polymer has a structural unit derived from at least one monomer selected from the group consisting of hydroxyl group-containing alkyl (meth)acrylates, unsaturated polyalkylene glycol ether-based monomers, and unsaturated alcohols.
[6] A fixed body comprising an inorganic filler, and a cured product of the binder composition according to any one of [1] to [5] fixing the inorganic filler.
[7] The fixed body according to [6], wherein the inorganic filler is a glass fiber or a powder glass.
[8] A method for manufacturing a fixed body, comprising a step of bringing a rust inhibitor having a sulfur atom in the molecule, a carboxyl group-containing polymer, and an inorganic filler into contact with one another to prepare an intermediate product; and a step of heating the intermediate product.
[9] The manufacturing method according to [8], wherein the rust inhibitor further has a nitrogen atom in the molecule.
[10] The manufacturing method according to [9], wherein the rust inhibitor comprises at least one selected from the group consisting of thiazole-based rust inhibitors, benzothiazole-based rust inhibitors, thiadiazole-based rust inhibitors, and thiourea-based rust inhibitors.
[11] The manufacturing method according to any one of [8] to [10], wherein the carboxyl group-containing polymer further has a hydroxyl group.
[12] The manufacturing method according to any one of [8] to [11], wherein the carboxyl group-containing polymer has a structural unit derived from at least one monomer selected from the group consisting of hydroxyl group-containing alkyl (meth)acrylates, unsaturated polyalkylene glycol ether-based monomers, and unsaturated alcohols.
[13] The manufacturing method according to any one of [8] to [12], wherein the inorganic filler is a glass fiber or a powder glass.

Advantageous Effects of Invention

According to the present invention, a binder composition can be provided with which the corrosion of manufacturing equipment and the yellowing of a fixed body to be manufactured are sufficiently prevented, and a favorable curing rate can be attained, and a fixed body using this can be provided. Moreover, according to the present invention, a method for manufacturing a fixed body can be provided with which the corrosion of manufacturing equipment and yellowing of a fixed body to be manufactured are sufficiently prevented, and a favorable curing rate can be attained.

DESCRIPTION OF EMBODIMENTS

Hereinafter, one embodiment according to the present invention will be described in detail, but the present invention is not limited to this. It should be noted that in the description, "(meth)acrylate" means "acrylate" or "methacrylate". The same applies to other similar expressions such as "(meth)acrylic acid".

<Binder Composition>

The binder composition according to the present embodiment comprises a rust inhibitor and a carboxyl group-containing polymer. The binder composition according to the present embodiment may also contain other components such as a curing accelerator, a crosslinking agent, and a solvent as needed. Hereinafter, the respective components will be described in detail.

(Rust Inhibitor)

The rust inhibitor according to the present embodiment has a sulfur atom in the molecule. If the rust inhibitor having a sulfur atom in the molecule is used in combination with a carboxyl group-containing polymer described later as a binder composition in the manufacturing of a fixed body, the corrosion of the manufacturing equipment made of iron and the like can be sufficiently prevented without adjusting the pH by a base such as aqueous ammonia. Furthermore, the yellowing of the fixed body to be manufactured can be sufficiently prevented and a favorable curing rate can be attained.

Specific examples of the rust inhibitor having a sulfur atom in the molecule include thiazole, 2-mercaptothiazoline, 2,2'-dibenzothiazole disulfide, benzothiazole, 2-mercaptobenzothiazole, 2-amino-5-mercapto-1,3,4-thiadiazole, 2,5-dimercapto-1,3,4-thiadiazole (bismuthiol), 2-thioacetic acid-5-mercapto-1,3,4-thiadiazole, 2,5-dithioacetic acid-1,3,4-thiadiazole, 1,3-dimethyl-2-thiourea, 1,3-diethyl-2-thiourea, 1,3-dibutyl-2-thiourea, 1,3-diisopropyl-2-thiourea, 2-mercaptoimidazoline, L-cysteine, L-cysteine, 3-mercaptopropionic acid, 3,3'-dithiodipropionic acid, 2-mercaptobenzooxazole, 2-mercaptobenzothiazole, furfurylmercaptan, benzylmercaptan, dibenzyl disulfide, 1,3-benzenedithiol, 1,4-butanedithiol, benzenethiol, cyclohexanethiol, dicyclohexyl disulfide, allylpropyl disulfide, 2-mercaptoethanol, 2,2-dithiodiethanol, octanethiol, and 3-(2-benzothiazolylthio)propionic acid. These rust inhibitors may be used alone or in combination of two of more.

From the viewpoint of further improving the effect to prevent the corrosion of the manufacturing equipment and the effect to prevent the yellowing of the fixed body, the rust inhibitor having a sulfur atom in the molecule is preferably a rust inhibitor further having a nitrogen atom in the molecule, more preferably a thiazole-based rust inhibitor (such as thiazole or 2-mercaptothiazoline), a benzothiazole-based rust inhibitor (such as benzothiazole, 2-mercaptobenzothiazole, or 2,2'-dibenzothiazole disulfide), a thiadiazole-based rust inhibitor (such as 2-amino-5-mercapto-1,3,4-thiadiazole, or bismuthiol), or a thiourea-based rust inhibitor (such as 1,3-diethyl-2-thiourea).

If the rust inhibitor has a group which can form a salt, such as a mercapto group, a carboxyl group, or an amino group, the rust inhibitor may be in the form of a salt. If the rust inhibitor has a mercapto group or a carboxyl group, it can be used as a lithium salt, a sodium salt, a potassium salt, a triethanolamine salt, a diethanolamine salt, or the like, for example. Moreover, if the rust inhibitor has an amino group, it can be used as a hydrochloric acid salt, a nitric acid salt, a sulfuric acid salt, or the like, for example. In particular, if the rust inhibitor is poorly soluble in water, the solubility in water can be improved by making it in the form of a salt.

The content of the rust inhibitor in the binder composition according to the present embodiment is preferably 1 to 3000 ppm, more preferably 10 to 2000 ppm, still more preferably 20 to 1500 ppm, particularly preferably 50 to 1000 ppm relative to the total amount of the binder composition. If the content of the rust inhibitor is within the predetermined range above, the effect to prevent the corrosion of the manufacturing equipment and the effect to prevent the yellowing of the fixed body to be manufactured can be further improved.

(Carboxyl Group-Containing Polymer)

The carboxyl group-containing polymer is a polymer having a structural unit containing at least a carboxyl group. The structural unit containing a carboxyl group can be obtained by radically polymerizing a carboxyl group-containing monomer, for example. The carboxyl group-containing monomer is a monomer having one or more groups selected from a carbon-carbon double bond, a carboxyl group, and salts of a carboxyl group.

Examples of the carboxyl group-containing monomer include unsaturated monocarboxylic acids such as (meth)acrylic acid, crotonic acid, α-hydroxyacrylic acid, and α-hydroxymethylacrylic acid; unsaturated dicarboxylic acids such as maleic acid, fumaric acid, itaconic acid, and 2-methyleneglutaric acid, and salts thereof. Among these, the carboxyl group-containing monomer is more preferably (meth)acrylic acid, maleic acid, or a salt thereof, still more preferably acrylic acid or maleic acid, particularly preferably acrylic acid. These may be used alone or in combination of two or more.

The salts of the carboxyl group specifically represent alkali metal salts, a lithium salt, a sodium salt, and a potassium salt; alkaline earth metal salts such as a calcium salt and a magnesium salt; transition metal salts such as an iron salt and an aluminum salt; an ammonium salts; organic amine salts and the like of the carboxyl group. Examples of the organic amine salts include salts of alkylamines such as methylamine and n-butylamine; salts of alkanolamines such as monoethanolamine, diethanolamine, triethanolamine, and dipropanolamine; and salts of polyamines such as ethylenediamine and diethylenetriamine.

The structural unit containing a carboxyl group is a structural unit obtained by radically polymerizing a carboxyl group-containing monomer, and indicates a structural unit represented by —$CH_2$—CH(COOH)—, for example, if the carboxyl group-containing monomer is acrylic acid.

It is preferred that the carboxyl group-containing polymer further have a structural unit containing a hydroxyl group. The structural unit having a hydroxyl group can be obtained by radically polymerizing a monomer having a hydroxyl group, for example. If the carboxyl group-containing polymer further has such a structural unit having a hydroxyl group, the carboxyl group-containing polymer can be crosslinked through an esterification reaction of the carboxyl group and the hydroxyl group. Thereby, the mechanical strength of the fixed body after curing is likely to be further enhanced.

Examples of the monomer having a hydroxyl group include hydroxyl group-containing alkyl (meth)acrylates, unsaturated polyalkylene glycol ether-based monomers, and unsaturated alcohols. These may be used alone or in combination of two or more.

Specific examples of the hydroxyl group-containing alkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, and α-hydroxymethylethyl (meth)acrylate.

Examples of the unsaturated polyalkylene glycol ether-based monomer include compounds obtained by adding alkylene oxides, such as ethylene oxide, propylene oxide, butylene oxide, styrene oxide, to unsaturated alcohols, such as 3-methyl-3-buten-1-ol, 3-methyl-2-buten-1-ol, and 2-methyl-3-buten-2-ol. More specifically, examples thereof include polyethylene glycol mono(3-methyl-3-butenyl)ether polyethylene glycol mono(3-methyl-2-butenyl)ether, polyethylene glycol mono(2-methyl-3-butenyl)ether, polyethylene glycol mono(2-methyl-2-butenyl)ether, polyethylene glycol mono(1,1-dimethyl-2-propenyl)ether, and polyethylene polypropylene glycol mono(3-methyl-3-butenyl)ether.

Specific examples of the unsaturated alcohol include allyl alcohol, β-methallyl alcohol, isoprenol, 3-methyl-3-buten-1-ol, 3-methyl-2-buten-1-ol, and 2-methyl-3-butene-2-ol.

The carboxyl group-containing polymer may have another structural unit other than the structural unit having a carboxyl group and the structural unit having a hydroxyl group. Examples of monomers providing the another structural unit include alkyl (meth)acrylates such as methyl (meth)acrylate, ethyl (meth)acrylate, butyl (meth)acrylate, cyclohexyl (meth)acrylate, and lauryl (meth)acrylate; amino group-containing acrylates such as dimethylaminoethyl (meth)acrylate or salts thereof; amide group-containing monomers such as (meth)acrylamide, dimethylacrylamide, and isopropylacrylamide; vinyl esters such as vinyl acetate; alkenes such as ethylene and propylene; aromatic vinyl-based monomers such as styrene; maleimide derivatives such as maleimide, phenylmaleimide, and cyclohexylmaleimide; nitrile group-containing vinyl-based monomers such as (meth)acrylonitrile; monomers having a sulfonate group such as 3-allyloxy-2-hydroxypropane sulfonic acid, 2-acrylamide-2-methylpropanesulfonic acid, styrenesulfonic acid, and vinylsulfonic acid or salts thereof; phosphonate group-containing monomers such as vinylphosphonic acid, allylphosphonic acid and methallylphosphonic acid; aldehyde group-containing vinyl-based monomers such as (meth) acrolein; alkyl vinyl ethers such as methyl vinyl ether, ethyl vinyl ether, and butyl vinyl ether; and other functional group-containing monomers such as vinyl chloride, vinylidene chloride, allyl alcohols: and vinylpyrrolidone. These may be used alone or in combination of two or more.

The proportion of the structural unit having a carboxyl group in the total structural units forming the carboxyl group-containing polymer (total of the structural unit containing carboxyl and another structural unit) is preferably 50 mol % or more, more preferably 60 mol % or more, still more preferably 70 mol % or more.

The carboxyl groups in the structural unit having a carboxyl group may be partially or completely present as salts, namely, a structural unit having a carboxyl group in the faun of a salt may be included. The carboxyl group-containing polymer having a structural unit having a carboxyl group in the form of a salt can be obtained by a method using the salt listed above as the carboxyl group-containing monomer, a method of synthesizing the carboxyl group-containing polymer, and thereafter neutralizing the polymer by a base, or the like. Examples of the base include inorganic bases such as lithium hydroxide, sodium hydroxide, and potassium hydroxide; ammonia; alkylamines such as methylamine and n-butylamine; alkanolamines such as monoethanolamine, diethanolamine, triethanolamine, and dipropanolamine; and polyamines such as ethylenediamine and diethylenetriamine. If alkanolamine is used as the base, a hydroxyl group derived from the alkanolamine can be given to the carboxyl group-containing polymer.

The proportion of the structural unit having a carboxyl group in the form of a salt if the carboxyl group-containing polymer has the structural unit having a carboxyl group in the form of a salt is preferably 0.1 to 50 mol %, more preferably 1 to 40 mol %, still more preferably 5 to 30 mol % in the total structural units forming the carboxyl group-containing polymer.

The proportion of the structural unit having a hydroxyl group if the carboxyl group-containing polymer has the structural unit having a hydroxyl group is preferably 0.1 to 50 mol %, more preferably 1 to 40 mol %, still more preferably 5 to 30 mol % in the total structural units forming the carboxyl group-containing polymer.

The weight average molecular weight (Mw) of the carboxyl group-containing polymer is preferably 100 to 50000, more preferably 500 to 30000, still more preferably 1000 to 20000. The weight average molecular weight can be measured by the measurement method described later.

The carboxyl group-containing polymer, if dissolved in water, usually exhibits acidity because it has a carboxyl group. In particular, if the binder composition is prepared as an aqueous solution, the pH of the aqueous solution is preferably 1 or more and less than 5, more preferably 1.5 or more and 4.5 or less, still more preferably 2 or more and 4 or less.

The content of the carboxyl group-containing polymer in the binder composition according to the present embodiment is preferably 70 to 99.999% by mass, more preferably 70 to 99.9% by mass, still more preferably 80 to 99.5% by mass, particularly preferably 85 to 99% by mass relative to the total solid content of the binder composition (namely, the total amount excluding the solvent).

A conventionally known polymer can be used as the carboxyl group-containing polymer. Specifically, for example, a carboxyl group-containing polymer can be used, which is produced by a conventionally known solution polymerization method of polymerizing a monomer composition containing the monomer above in water in the presence of a polymerization initiator such as sodium persulfate and a curing accelerator such as sodium hypophosphite under a condition of heating under reflux, or the like.

(Other Components)

The binder composition according to the present embodiment may contain a curing accelerator because the mechanical strength of the fixed body to be manufactured is likely further enhanced.

Examples of the curing accelerator include oxides, chlorides, hydroxides, and alkoxides of phosphorus-containing compounds, proton acids (such as sulfuric acid, carboxylic acid, and carbonic acid) and salts thereof (such as salts of metals (alkali metals, alkaline earth metals, transition metals, and metals of Groups 2B, 4A, 4B, and 5B), and ammonium salts), and metals (those listed above). Examples of the phosphorus-containing compounds include acid radical-containing compounds (also including hydrates thereof) such as hypophosphorous acid (salts), phosphorous acid (salts), phosphoric acid (salts), pyrophosphoric acid (salts), polyphosphoric acid (salts), and organic phosphoric acid (salts); and organic phosphorus compounds such as trimethyl phosphine, triphenyl phosphine, and triphenylphosphine oxide. These may be used alone or in combination of two or more.

The content of the curing accelerator if the binder composition according to the present embodiment contains the curing accelerator is preferably 0.1 to 20% by mass, more preferably 0.2 to 10% by mass, still more preferably 0.5 to 7% by mass in the total amount of the binder composition.

The binder composition according to the present embodiment may contain a crosslinking agent because the mechanical strength of the fixed body to be manufactured is likely to be enhanced.

Because the mechanical strength of the fixed body to be manufactured is likely to be enhanced, the molecular weight of the crosslinking agent is preferably 1000 or less, more preferably 500 or less, particularly preferably 300 or less.

As the crosslinking agent, a compound having two or more hydroxyl groups and/or amino groups in the molecule or the like can be used. Examples of preferred crosslinking agents include alkane diols such as ethylene glycol, propylene glycol, 1,3-propanediol, butylene glycol, 1,4-butanediol, 1,5-pentanediol, and 1,6-hexanediol; (poly)oxyalkylene glycols such as diethylene glycol, triethylene glycol, and polyalkylene glycol; tri- or higher valent alcohols such as glycerol, polyglycerol, erythritol, xylitol, and sorbitol; alkanolamines such as monoethanolamine, diethanolamine, and triethanolamine; polyamines such as ethylenediamine and diethylenetriamine; and polyols of the polyamines to which alkylene oxides are added.

The content of the crosslinking agent if the binder composition according to the present embodiment contains the crosslinking agent is preferably 1 to 50 mol parts, more preferably 5 to 40 mol parts, still more preferably 10 to 35 mol parts, particularly preferably 15 to 30 mol parts relative to 100 mol parts of an acid radical contained in the carboxyl group-containing polymer.

The binder composition according to the present embodiment is preferably a binder composition in a state of solution containing a solvent from the viewpoint of the operationability. Although water and/or an organic solvent may be contained as the solvent, it is preferred that water be contained. Moreover, preferably 50% by mass or more of the total amount of the solvent is water, more preferably 75% by mass or more thereof is water, and still more preferably the total amount of the solvent is water. If the components such as a rust inhibitor are poorly soluble in the solvent, the solution may be used as a dispersion solution, but is preferably a uniform solution such that the amount of the binder composition brought into contact with the inorganic filler is constant.

The content of the solvent if the binder composition according to the present embodiment contains the solvent can be 5% by mass to 90% by mass of the total amount of the binder composition, for example.

The binder composition above can be suitably used to fix an inorganic filler or an organic filler. Moreover, the binder composition above can be suitably used as a binder composition for a thermal insulation material.

Examples of the inorganic filler include inorganic fibers such as glass fibers, rock wool, and carbon fibers; and inorganic particles (inorganic powder) such as powder glass, glass particles (glass beads), and mineral particles. Among these, the inorganic filler is preferably glass fibers or powder glass because the fixed body can be widely used as a thermal insulation material or the like.

Examples of the organic filler include fibers of organic products such as wool, cellulose, hemp, nylon, and polyester; and particles of organic products (powders of organic products) such as nylon nanoparticles and polyester nanoparticles.

<Fixed Body>

The fixed body according to the present embodiment comprises an inorganic filler, and a cured product of the binder composition above fixing the inorganic filler. As the inorganic filler, those described above can be used. The fixed body can be manufactured by the method for manufacturing a fixed body described later, for example.

<Method for Manufacturing Fixed Body>

The method for manufacturing a fixed body according to the present embodiment comprises a contact step of bringing a rust inhibitor having a sulfur atom in the molecule, a carboxyl group-containing polymer, and an inorganic filler into contact with one another to obtain an intermediate product; and a heating step of heating the intermediate product. As the rust inhibitor having a sulfur atom in the molecule, the carboxyl group-containing polymer, and the inorganic filler, those described above can be used, respectively.

In the contact step, the rust inhibitor having a sulfur atom in the molecule and the carboxyl group-containing polymer may be separately brought into contact with the inorganic filler, or may be preliminarily mixed and then brought into contact with the inorganic filler; however, from the viewpoint of the operationability, it is preferred that a solution of the rust inhibitor having a sulfur atom in the molecule and the carboxyl group-containing polymer dissolved in a solvent be brought into contact with the inorganic filler. The solution may be the binder composition in the state of solution (also simply referred to as "binder composition"). Hereinafter, the method of contacting the binder composition with the inorganic filler will be described.

Examples of the method of bringing the binder composition into contact with the inorganic filler include a method of impregnating the inorganic filler into the binder composition, and a method of spraying the binder composition to the inorganic filler. Among these, the method of spraying the binder composition to the inorganic filler is preferred because the amount of the binder composition adhered can be readily adjusted. The amount of the binder composition adhered indicates the amount of the binder composition actually adhered to the inorganic filler after the contact step.

The amount of the binder composition adhered in terms of the solid content is preferably 1 to 40 parts by mass, more preferably 1 to 30 parts by mass, still more preferably 1 to 15 parts by mass relative to 100 parts by mass of the inorganic filler. If the amount of the binder composition adhered is within the range, the mechanical strength of the fixed body to be manufactured is likely to be enhanced.

In the heating step, at least the carboxyl group-containing polymer in the intermediate product is cured by heating the intermediate product to cure the entire intermediate product. Although the heating temperature and the heating time in the heating step can be 100 to 300° C. and 1 to 120 minutes, it is preferred from the viewpoint of the operationability that the heating be performed at a low temperature in a short time. For example, the heating temperature is preferably 120 to 250° C., more preferably 140 to 230° C., still more preferably 150 to 200° C. Moreover, the heating time is preferably 1 to 60 minutes, more preferably 1 to 45 minutes, still more preferably 1 to 30 minutes. According to the method for manufacturing a fixed body according to the present embodiment, the curing rate is faster than that in the method using a conventional binder, and therefore a fixed body having desired bending strength can be obtained at a relatively low temperature in a relatively short time.

EXAMPLES

Hereinafter, the present invention will be described in more detail by way of Examples, but the present invention is not limited to only these Examples.

<Measurement Conditions for Weight Average Molecular Weight>
Apparatus: HLC-8320 GPC manufactured by Tosoh Corporation
Detector: RI
Columns: TSK-GEL G4000 PWXL, G3000 PWXL manufactured by Tosoh Corporation
Column temperature: 40° C.
Flow rate: 0.5 ml/min
Calibration curve: POLY SODIUM ACRYLATE STANDARD manufactured by Sowa Kagaku K.K.
Eluent: a solution prepared by diluting a mixture of sodium dihydrogen phosphate dodecahydrate/disodium hydrogen phosphate dihydrate (34.5 g/46.2 g) to 5000 g with pure water <Method of Measuring Solid Content of Carboxyl Group-Containing Polymer Aqueous Solution>
A carboxyl group-containing polymer aqueous solution was left to stand in an oven heated to 150° C. for 20 minutes to perform drying. The solid content (%) was calculated from a change in weight before and after the drying.

<Method of Measuring pH>
The pH value of the carboxyl group-containing polymer aqueous solution (adjusted to 25° C.) whose solid content was adjusted to 35% by adding pure water was measured with a pH meter.

<Method of Evaluating Anticorrosiveness>
50 g of a binder composition was placed in a glass container; a rolled steel sheet having an opening (grate: SPCC-SD, size: a thickness of 1 mm, a length of 30 mm, and a width of 30 mm) was hung with a string-like Teflon® and immersed into the binder composition. The rolled steel sheet was left to stand at 25° C. for 20 days, and then the weight reduction rate thereof was measured.

From the viewpoint of practicality, the weight reduction rate of the rolled steel sheet needs to be less than 0.5%, and is preferably less than 0.1%, more preferably less than 0.09%.

<Method of Evaluating Bending Strength>
100 g of the binder composition and 350 g of glass beads having a particle size of 50 to 93 μm were sufficiently mixed. Next, the resulting mixture was pushed into a releasing treated mold of 140 mm×20 mm×5 mm for molding, and left to stand in an oven on a predetermined curing condition (temperature, time). Subsequently, the mold was placed into a desiccator and cooled for 30 minutes to obtain a test piece for bending strength. Next, according to JISK7171, the bending strength (MPa) was measured at a test rate of 2 mm/min 5 times, and the average was calculated.

From the viewpoint of practicality, the bending strength needs to be 7 MPa or more, and is preferably 8 MPa or more, still more preferably 9 MPa or more.

<Method of Evaluating Degree of Yellowness>
100 g of the binder composition and 350 g of glass beads having a particle size of 0.35 to 0.50 mm were sufficiently mixed. Next, the resulting mixture was pushed into a release treated mold of 50 mm×50 mm×5 mm for molding, and left to stand in an oven on a predetermined curing condition (temperature, time). Subsequently, the mold was placed into a desiccator and cooled for 30 minutes to obtain a test piece for measuring degree of yellowness. Next, according to JISK7373 (reflection mode), the degree of yellowness (YI value) was measured 3 times using a spectrophotometer (product No. SE-2000) manufactured by Nippon Denshoku Industries Co., Ltd., and the average was calculated.

From the viewpoint of the appearance, the degree of yellowness needs to be less than 15, and is preferably less than 12, more preferably less than 10.

Production Example 1

200 g of pure water (initial charge) was charged into an SUS separable flask having a volume of 2.5 liter and provided with a reflux cooler, a stirrer (paddle blade), and a thermometer, and heated to the boiling point under stirring. In the next step, under stirring, 400 g (i.e., 4.44 mol) of a 80% by mass acrylic acid aqueous solution (hereinafter, referred to as "80% AA") for 180 minutes, 290.0 g (i.e., 1.12 mol) of a 50% by mass hydroxyethyl methacrylate (hereinafter, referred to as "50% HEMA") for 180 minutes, 25.0 g of a 15% by mass sodium persulfate aqueous solution (hereinafter, referred to as "15% NaPS") for 195 minutes, and, at two feeding rates, 15.0 g of a 45% by mass sodium hypophosphite aqueous solution (hereinafter, referred to as "45% SHP") for 18 minutes and subsequently 50.0 g for 192 minutes were added dropwise through separate feeding passages from distal end nozzles, respectively, to a polymerization reaction system in a boiling point reflux state. The addition of each component except for 45% SHP was continuously performed at a predetermined addition rate. After the addition of 80% AA was completed, the reaction solution was kept (aged) in the boiling point reflux state over 30 minutes to complete the polymerization. After the polymerization was completed, 25.0 g of 45% SHP was added to the reaction solution to obtain a carboxyl group-containing polymer (1) aqueous solution. The solid content of the aqueous solution was 51.5%, and the weight average molecular weight (Mw) was 6500.

Production Example 2

400 g of pure water was charged (initial charge) into an SUS separable flask having a volume of 2.5 liter and provided with a reflux cooler, a stirrer (paddle blade), and a thermometer, and heated to the boiling point under stirring. In the next step, under stirring, 600 g (i.e., 6.66 mol) of 80% AA for 180 minute, 25.0 g of 15% NaPS for 195 minutes, and, at two feeding rates, 15.0 g of 45% SHP for 18 minutes and subsequently 50.0 g for 192 minutes were added dropwise through separate feeding passages from the distal end nozzles, respectively, to the polymerization reaction system in the boiling point reflux state. The addition of each component except 45% SUP was continuously performed at a predetermined addition rate. After the addition of 80% AA was completed, the reaction solution was kept (aged) in the boiling point reflux state over 30 minutes to complete the polymerization. After the polymerization was completed, 25.0 g of 45% SHP was added to the reaction solution. Next, 140 g of diethanolamine (AA neutralization rate: 20%) was added dropwise through a separate feeding passage from a distal end nozzle to the polymerization tank to obtain a carboxyl group-containing polymer (2) aqueous solution. The solid content of the aqueous solution was 52.8%, and the weight average molecular weight (Mw) was 7800.

Production Example 3

400 g of pure water was charged (initial charge) into an SUS separable flask having a volume of 2.5 liter and provided with a reflux cooler, a stirrer (paddle blade), and a thermometer, and heated to the boiling point under stirring. In the next step, under stirring, 600 g (i.e., 6.66 mol) of 80% AA for 180 minutes, 25.0 g of 15% NaPS for 195 minutes, and, at two feeding rates, 15.0 g of 45% SUP for 18 minutes and subsequently 50.0 g for 192 minutes were added dropwise through separate feeding passages from distal end nozzles, respectively, to the polymerization reaction system in the boiling point reflux state. The addition of each component except 45% SHP was continuously performed at a predetermined addition rate. After the addition of 80% AA was completed, the reaction solution was kept (aged) in the boiling point reflux state over 30 minutes to complete the polymerization. After the polymerization was completed, 25.0 g of 45% SHP was added to the reaction solution. Next, 100 g (i.e., 20 mol % of 1,3-propanediol relative to the carboxyl group in the polymer) of 1,3-propanediol was added dropwise through a separate feeding passage from a distal end nozzle to the polymerization tank to obtain a carboxyl group-containing polymer (3) aqueous solution. The solid content of the aqueous solution was 51.2%, and the weight average molecular weight (Mw) was 7800.

The curing condition in the evaluations of the bending strength and the degree of yellowness was 220° C./30 minutes.

Examples 2 to 10, Comparative Examples 1 to 5

The anticorrosiveness, the bending strength, and the degree of yellowness were measured in the same manner as in Example 1 except that the rust inhibitor shown in Table 1 was used. The results are shown in Table 1.

Comparative Example 6

The anticorrosiveness, the bending strength, and the degree of yellowness were measured in the same manner as in Example 1 except that the rust inhibitor was not used, pure water and aqueous ammonia were added to adjust the solid content to 35% and the pH to 7. The results are shown in Table 1.

TABLE 1

| Items | Rust inhibitor | pH | Anticorrosiveness Weight reduction % | Bending strength MPa | Degree of yellowness YI |
|---|---|---|---|---|---|
| Example 1 | 2-Mercaptothiazoline | 3.0 | 0.075 | 9.2 | 9.1 |
| Example 2 | 2-Amino-5-mercapto-1,3,4-thiadiazole | 3.0 | 0.085 | 9.4 | 9.1 |
| Example 3 | 2,2'-Dibenzothiazole disulfide | 3.0 | 0.089 | 9.3 | 9.2 |
| Example 4 | 3-Mercaptopropionic acid | 3.0 | 0.485 | 8.9 | 10.5 |
| Example 5 | 3,3'-Dithiodipropionic acid | 3.0 | 0.399 | 9.3 | 11.2 |
| Example 6 | 1,3-Diethyl-2-thiourea | 3.0 | 0.082 | 9.1 | 9.8 |
| Example 7 | L-cysteine | 3.0 | 0.098 | 9.2 | 9.6 |
| Example 8 | L-cystine | 3.0 | 0.098 | 9.1 | 9.4 |
| Example 9 | 2-Mercaptobenzothiazole | 3.0 | 0.071 | 9.3 | 9.3 |
| Example 10 | 2-Mercaptobenzothiazole sodium | 3.0 | 0.079 | 9.4 | 9.4 |
| Comparative Example 1 | Aspartic acid | 3.0 | 5.551 | 9.1 | 9.3 |
| Comparative Example 2 | 1,2,3-Benzotriazole | 3.0 | 4.345 | 9.3 | 10.7 |
| Comparative Example 3 | Hydroquinone | 3.0 | 10.234 | 9.2 | 9.2 |
| Comparative Example 4 | 5-Amino-1H-tetrazole | 3.0 | 6.124 | 9.1 | 11.1 |
| Comparative Example 5 | 3,4,5-Trihydroxybenzoic acid | 3.0 | 8.112 | 9.1 | 9.1 |
| Comparative Example 6 | None | 7.0 | 0.114 | 8.1 | 15.1 |

Example 1

Pure water was added to the carboxyl group-containing polymer (1) aqueous solution obtained in Production Example 1 to adjust the solid content to 35%, and the pH value was measured. Next, 2-mercaptothiazoline as a rust inhibitor was added such that the concentration was 100 ppm. The resulting binder composition (aqueous solution) was measured for the anticorrosiveness, the bending strength, and the degree of yellowness by the measurement methods above. The results are shown in Table 1.

Examples 11 to 16

The anticorrosiveness, the bending strength, and the degree of yellowness were measured in the same manner as in Example 1 except that the kind and amount of the rust inhibitor were changed as shown in Table 2. The results are shown in Table 2.

TABLE 2

| Items | Rust inhibitor | Amount ppm | pH | Anticorrosiveness weight reduction % | Bending strength MPa | Degree of yellowness YI |
|---|---|---|---|---|---|---|
| Example 11 | 2-Mercaptobenzothiazole sodium | 50 | 3.0 | 0.139 | 9.2 | 9.4 |
| Example 12 | 2-Mercaptobenzothiazole sodium | 250 | 3.0 | 0.049 | 9.4 | 9.6 |
| Example 13 | 2-Mercaptobenzothiazole sodium | 500 | 3.0 | 0.044 | 9.4 | 9.7 |
| Example 14 | 2-Mercaptobenzothiazole sodium | 1000 | 3.0 | 0.041 | 9.4 | 9.8 |
| Example 15 | 3-Mercaptopropionic acid | 500 | 3.0 | 0.315 | 9.3 | 11.5 |
| Example 16 | 1,3-Diethyl-2-thiourea | 500 | 3.0 | 0.052 | 9.1 | 9.7 |

Examples 17 to 20

The bending strength and degree of yellowness were measured in the same manner as in Example 1 except that the curing condition in the evaluations of the bending strength and the degree of yellowness was changed as shown in Table 3. The results are shown in Table 3.

Comparative Examples 7 to 10

The bending strength and degree of yellowness were measured in the same manner as in Comparative Example 6 except that the curing condition in the evaluations of the bending strength and the degree of yellowness was changed as shown in Table 3. The results are shown in Table 3.

TABLE 3

| Items | Rust inhibitor | pH | Curing condition | Bending strength MPa | Degree of yellowness YI |
|---|---|---|---|---|---|
| Example 17 | 2-Mercaptothiazoline | 3.0 | 200° C./30 minutes | 9.3 | 8.3 |
| Example 18 | 2-Mercaptothiazoline | 3.0 | 190° C./30 minutes | 9.3 | 7.9 |
| Example 19 | 2-Mercaptothiazoline | 3.0 | 180° C./30 minutes | 9.0 | 7.6 |
| Example 20 | 2-Mercaptothiazoline | 3.0 | 180° C./20 minutes | 9.1 | 7.1 |
| Comparative Example 7 | None | 7.0 | 200° C./30 minutes | 7.3 | 16.3 |
| Comparative Example 8 | None | 7.0 | 190° C./30 minutes | 6.4 | 17.5 |
| Comparative Example 9 | None | 7.0 | 180° C./30 minutes | 5.9 | 18.6 |
| Comparative Example 10 | None | 7.0 | 180° C./20 minutes | 5.2 | 19.2 |

Examples 21 and 22

The anticorrosiveness, the bending strength, and the degree of yellowness were measured in the same manner as in Example 1 except that the aqueous solutions of the carboxyl group-containing polymers shown in Table 4 were used. The results are shown in Table 4.

TABLE 4

| Items | Rust inhibitor | Carboxyl group-containing polymer | pH | Anticorrosiveness weight reduction % | Bending strength MPa | Degree of yellowness YI |
|---|---|---|---|---|---|---|
| Example 21 | 2-Mercaptothiazoline | (2) | 3.0 | 0.065 | 7.3 | 9.5 |
| Example 22 | 2-Mercaptothiazoline | (3) | 2.9 | 0.085 | 7.8 | 10.9 |

The invention claimed is:

1. A binder composition comprising
a rust inhibitor comprising at least one selected from the group consisting of 2-Mercaptothiazoline, 2-Amino-5-mercapto-1,3,4-thiadiazole, 2,2'-Dibenzothiazole disulfide, 3-Mercaptopropionic acid, 3,3'-Dithiodipropionic acid, 1,3-Diethyl-2-thiourea, L-cysteine, L-cystine, 2-Mercaptobenzothiazole, 2-Mercaptobenzothiazole sodium, 2,5-dimercapto-1,3,4-thiadiazole, 2-thioacetic acid-5-mercapto-1,3,4-thiadiazole, and 2,5-dithioacetic acid-1,3,4-thiadiazole, and
a carboxyl group-containing polymer, in which a percentage of structural units containing a carboxyl group to the total structural units constituting the carboxyl group-containing polymer is 50 mol % or more,
wherein the binder composition is an aqueous solution, and a pH of the aqueous solution is 1 or more and less than 5,
wherein the content of the rust inhibitor in the binder composition is 10 to 3000 ppm, and
wherein the composition causes a weight reduction of less than 0.5% to a rolled steel sheet having an opening (grate: SPCC-SD, size: a thickness of 1 mm, a length of 30 mm, and a width of 30 mm) hung with a string-like Teflon® and immersed into the binder composition.

2. The binder composition according to claim 1, wherein the carboxyl group-containing polymer further has a hydroxyl group.

3. The binder composition according to claim 1, wherein the carboxyl group-containing polymer has a structural unit derived from at least one monomer selected from the group consisting of hydroxyl group-containing alkyl (meth)acrylates, unsaturated polyalkylene glycol ether-based monomers, and unsaturated alcohols.

4. The binder composition according to claim 1, wherein the content of the rust inhibitor in the binder composition is from 10 to 2000 ppm.

5. The binder composition according to claim 1, wherein the content of the rust inhibitor in the binder composition is from 50 to 1000 ppm.

6. The binder composition according to claim 1, wherein the weight average molecular weight of the carboxyl group-containing polymer is 100 to 50000.

7. The binder composition according to claim 1, wherein the rust inhibitor comprises at least one selected from the group consisting of 2-amino-5-mercapto-1,3,4-thiadiazole, 2,5-dimercapto-1,3,4-thiadiazole, 2-thioacetic acid-5-mercapto-1,3,4-thiadiazole, 2,5-dithioacetic acid-1,3,4-thiadiazole.

8. The binder composition according to claim 1, wherein the rust inhibitor comprises 2-amino-5-mercapto-1,3,4-thiadiazole.

9. The binder composition according to claim 1, wherein the binder composition reduces yellowing of a fixed body comprising a cured product of the binder composition.

10. The binder composition according to claim 1, wherein a test piece comprising the composition achieves a bending strength of 7 MPa a measured by a test rate of 2 mm/min 5 time according to JISK7171, the test piece formed by:
    mixing 100 g of the binder composition and 350 g of glass beads having a particle size of 50 to 93 μm to obtain a mixture,
    pushing the mixture into a releasing treated mold of 1.40 mm×20 mm×5 mm to form a molded mixture; and
    curing the molded mixture in an oven; and
    cooling the cured mixture in a desiccator for 30 minutes.

11. The binder composition of claim 1, wherein a test piece comprising the composition achieves a degree of yellowness of less than 15 as measured using a spectrophotometer according to JISK7373, the test piece formed by:
    mixing 100 g of the binder composition and 350 g of glass beads having a particle size of 0.35 to 0.50 μm to obtain a mixture, pushing the mixture into a release treated mold of 50 mm×50 mm×5 mm to form a molded mixture; and curing the molded mixture in an oven; and cooling the cured mixture in a desiccator for 30 minutes.

12. A fixed body comprising an inorganic filler, and a cured product of the binder composition according to claim 1 fixing the inorganic filler.

13. The fixed body according to claim 12, wherein the inorganic filler is a glass fiber or a powder glass.

14. A method for manufacturing a fixed body, comprising bringing the binder composition of claim 1 and an inorganic filler into contact with each other to obtain an intermediate product; and heating the intermediate product.

15. The manufacturing method according to claim 14, wherein the rust inhibitor further has a nitrogen atom in the molecule.

16. The manufacturing method according to claim 15, wherein the rust inhibitor further comprises a thiazole-based rust inhibitor.

17. The manufacturing method according to claim 14, wherein the carboxyl group-containing polymer further has a hydroxyl group.

18. The manufacturing method according to claim 14, wherein the carboxyl group-containing polymer has a structural unit derived from at least one monomer selected from the group consisting of hydroxyl group-containing alkyl (meth)acrylates, unsaturated polyalkylene glycol ether-based monomers, and unsaturated alcohols.

19. The manufacturing method according to claim 14, wherein the inorganic filler is a glass fiber or a powder glass.

20. A binder composition comprising
a rust inhibitor comprising a thiadiazole-based rust inhibitor, and
a carboxyl group-containing polymer, in which a percentage of structural units containing a carboxyl group to the total structural units constituting the carboxyl group-containing polymer is 50 mol % or more, wherein a content of the carboxyl-group containing polymer in the binder composition is 70 to 99.999 mass % based on the total solid content of the binder composition, wherein the rust inhibitor in the binder composition is 10 to 3000 ppm, wherein the binder composition reduces yellowing of a fixed body comprising a cured product of the binder composition, and wherein the composition causes a weight reduction of less than 0.5% to a rolled steel sheet having an opening (grate: SPCC-SD, size: a thickness of 1 mm, a length of 30 mm, and a width of 30 mm) hung with a string-like Teflon® and immersed into the binder composition.

21. The binder composition according to claim 20, wherein the binder composition is an aqueous solution, and the pH of the aqueous solution is 1 or more and less than 5.

22. The binder composition according to claim 21, wherein the weight average molecular weight of the carboxyl group-containing polymer is 100 to 50000.

23. The binder composition according to claim 20, wherein the carboxyl group-containing polymer has a structural unit derived from at least one monomer selected from the group consisting of hydroxyl group-containing alkyl (meth)acrylates, unsaturated polyalkylene glycol ether-based monomers, and unsaturated alcohols.

24. The binder composition according to claim 20, wherein the content of the rust inhibitor in the binder composition is from 10 to 2000 ppm.

25. The binder composition according to claim 20, wherein the content of the rust inhibitor in the binder composition is from 50 to 1000 ppm.

* * * * *